March 2, 1965
R. J. POPPENGA
3,171,200
CARPET REPAIR TOOL
Filed Sept. 26, 1962
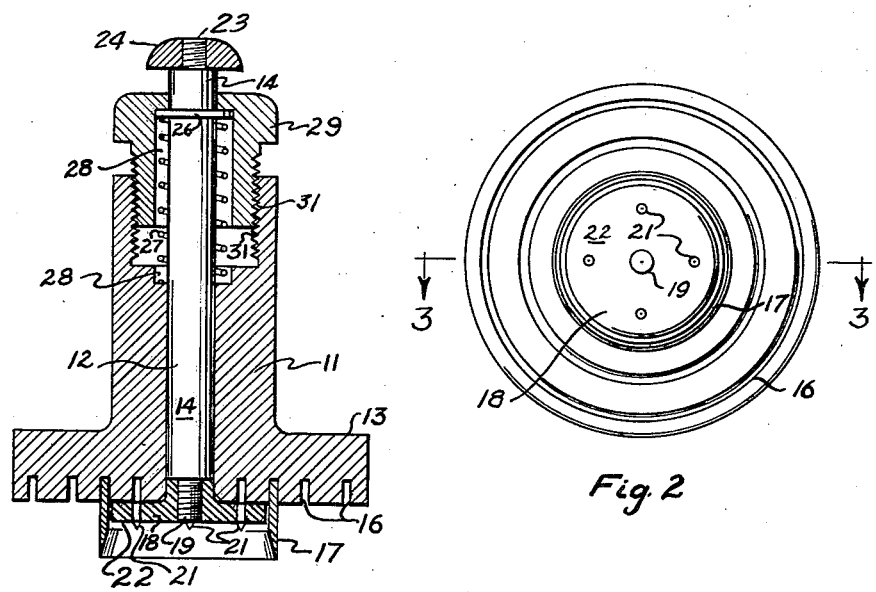
Fig. 3
Fig. 2
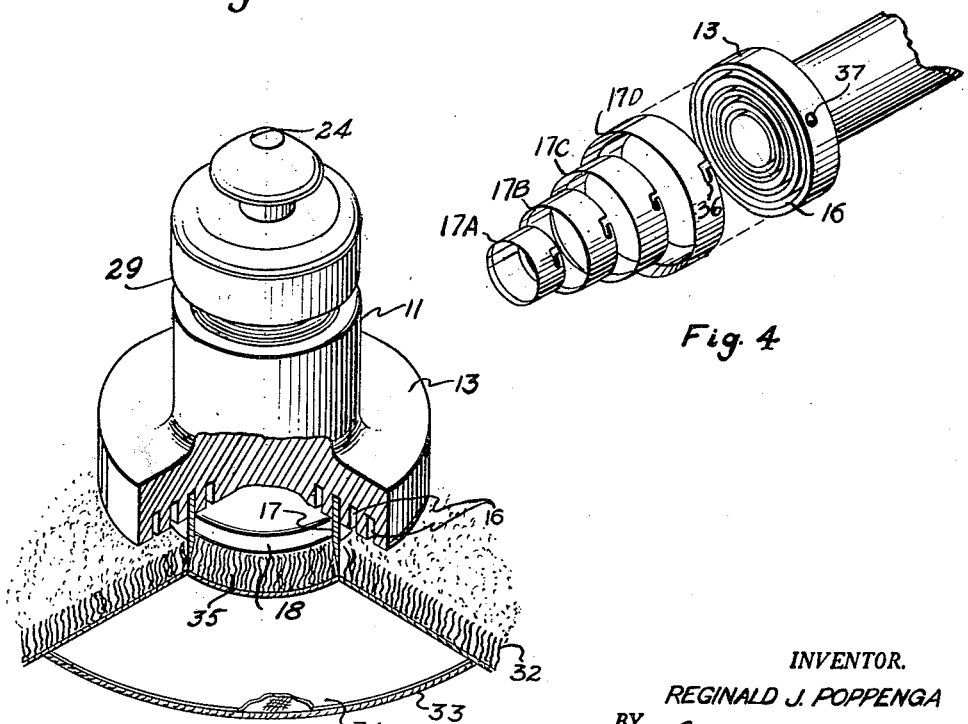
Fig. 4
Fig. 1
INVENTOR.
REGINALD J. POPPENGA
BY
ATTORNEY

United States Patent Office 3,171,200
Patented Mar. 2, 1965

3,171,200
CARPET REPAIR TOOL
Reginald J. Poppenga, 8318 Benton St., Arvada, Colo.
Filed Sept. 26, 1962, Ser. No. 226,299
2 Claims. (Cl. 30—130)

The present invention relates to a carpet repair tool and, more specifically, to a tool or instrument particularly adapted to aid in the mending of carpeting and similar materials and objects.

Previously, workmen have been required to replace and patch burned holes and damaged spots in carpeting by the application of considerable hand work and the expenditure of excessive time.

The present inventor here seeks to provide a specialized tool and instrument which will facilitate the repair of damaged spots in carpeting through the elimination of time consuming hand operations. In the provision of such tool the inventor has been guided by the following objects:

First, to provide a tool which will accurately cut away a damaged portion of carpeting in such manner that an undamaged replacement piece of proper size and shape may be inserted in the damaged spot.

Second, to provide a cutting instrument which will facilitate the removal of damaged spots and which may further be used for the efficient insertion and replacement of repair pieces of carpeting.

Third, to provide a tool which can be used to remove damaged spots of different size from carpeting so that all repairs will be made on a minimum sized piece of carpet.

Fourth, to provide a tool which may be quickly and efficiently operated to effect a carpet repair that is efficient and pleasing in appearance.

A further object of the invention is to provide a tool and instrument which may be used to properly insert, place and orient a repair section of carpeting with respect to the carpet being repaired and the patterned face of such carpet.

A further specific object of the invention is to provide a tool and instrument which may be used to cut and remove a damaged spot from carpeting in place without danger of cutting through subsurfaces or padding beneath the carpeting.

Further objects and advantages of the present invention will be apparent from the appended description and drawings, in which FIG. 1 is a perspective illustration showing the over-all nature of the present invention;

FIG. 2 is a bottom view of an embodiment of the invention;

FIG. 3 is a cross-sectional elevation taken along the line 3—3 of FIG. 2; and

FIG. 4 is a perspective view showing the nature of a plurality of cutters selectively usable with the tool and instrument.

Briefly stated, the present invention provides a cutter tool of size and conformation such that it will selectively receive and hold one of a plurality of cutter elements so that the entire tool may be rotated or struck when the cutter element has been properly positioned over a damaged spot in carpeting to efficiently cut and remove a section of such damaged carpeting. The tool is similarly used to remove a replacement plug section of carpeting from a new or non-exposed piece, and thereafter the new piece may through aid and use of the cutter and plunger elements of the tool be inserted, placed and properly oriented in its new position to mate and match the pattern of the carpet being repaired.

One embodiment illustrative of the features of the invention is shown in the accompanying drawings. In these drawings it will be noted that the tool provides a body 11 having a central opening 12 and an outwardly disposed flange 13. The central opening 12 provides a passage for the reception of a plunger rod 14 while the flange 13 provides a plurality of concentrically positioned slots 16 adapted for the selective reception of one or more of a plurality of cutter members 17 indicated in FIG. 4 as being cutters 17A and 17D.

The plunger rod 14 operating in the central opening 12 is provided at its lower end with a disk element 18 which may be held on the plunger as by the threads 19. The disk 18 itself provides support for a plurality of pins 21 which extend outwardly from the flat face 22 of the disk 18 to engage the textured face of a carpet piece being removed or inserted through use of this tool. The upper end of the plunger 14 is provided with a head 24 which again is secured to the plunger by means of threads 23.

As further elements of a further embodiment of the invention, the plunger 14 may be provided with a shoulder 26 so that a spring element 27 engaged about the plunger may work against such shoulder and within a recess opening 28 in the body 11 to hold or bias a plunger and its associated elements toward its non-engaged position. As shown in FIG. 3, an adjusting sleeve 29 is provided to be threadedly received by the internal threads 31 cut in the body 11. The adjustment of the relative positioning of the sleeve 29 and body 11 can be used to adjust the spring force of the spring 27, or, more importantly, to establish a limit for the downward reciprocal travel of the plunger head 24.

When properly adjusted, the inward movement of the plunger 14, and, accordingly, of the disk 18 may be adjusted and limited by the interference between the plunger head 24 and the adjusting sleeve 29. This adjustment makes it possible to use the tool in such manner that the cutting effects of the cutters 17 will be limited to the cutting and removal of a carpet piece only. Accordingly, this tool may be used to remove a segment of carpet without damage to the underlying pad or floor surface. With the depth of stroke properly adjusted, blows struck against the plunger head 24 and transmitted by the adjusting sleeve 29 to the body 11 will serve to cut through only the carpet 32, since a portion of the carpet will be compressed against the disk 18 to prevent further penetration of the cutter 17. The pad 33 can be left in undamaged condition.

After the pile and fabric of the carpeting has been cut, the circular piece 35 of damaged carpeting may be removed. This removal is facilitated by the structure illustrated, since the plunger 14 may be rotated to engage the pins 21 with the carpeting. This supplementary rotating movement of the plunger and disk frees the damaged carpet piece 35 so that it will usually be retained within the cutter 17 when the tool is raised away from its point of use. Reciprocal movement of the plunger 14 then will expel the damaged piece of carpeting. Subsequently a replacement segment 35 of carpeting may be cut from a carpet repair supply piece through the repeated use of this tool.

A simple type of carpet repair is illustrated in FIGURE 1. Previous to the illustrated step, the damaged section has been removed to leave a round circular opening as cut by one of the selected cutters 17. A fabric piece 34, to both sides of which adhesive has been applied, is next inserted through the cut opening in the carpet. The fabric piece is smoothed out in position on top of the pad 33 and beneath the cut opening and extending outwardly thereabout. After accomplishment of such step, pressure may be applied to obtain a secure bond between the fabric piece 34, the pad 33 and the carpet 32.

While the still exposed adhesive on the fabric patch 34 is still in proper condition, a replacement segment 35 of carpet is introduced into the cut opening by use of the tool. In this use of the tool the cutter member 17 serves to open a path for the introduction of the replacement segment 35 positioned and retained by the tool. After the segment 35 has been brought to the proper position, the plunger 14 may be depressed to expel the replacement segment and to exert pressure on such segment and against the adhesive on the fabric piece 34.

If patterned carpet is being repaired, the texture of the replacement segment 35 may be matched with the texture and pattern of the carpet 32 itself by turning the plunger head 24. This motion will tend to rotate the replacement segment 35 in its position due to the action of the disk 18 and the pins 21 thereon.

These described uses of the tool should indicate that the applicant provides an instrument which fully satisfies its intended objectives. It should further be noted that the tool makes it possible to accomplish carpet and similar repairs quickly and efficiently. Tedious hand manipulations, inclusive of patterning, cutting and sewing are avoided. The use of the cutter element 17 and of the various assorted sizes thereof makes it certain that each repair can be made accurately and of a minimum size compatible with the area of damage. Selective use of any of the multiple cutters 17A through 17D in the grooves 16 of the flange 13 is facilitated through the provision of cooperative catch and lock pin members 36 and 37, as shown in FIGURE 4.

While separate features of a specific embodiment of the invention have been shown and described, it should be understood that the present invention is adaptable to various modifications and changes. All such modifications and changes as come within the scope of the hereunto appended claims are considered to be a part of this invention.

I claim:

1. A carpet repair tool adapted for the removal of damaged carpet segments and for the replacement of carpet repair pieces comprising a body member providing a central opening longitudinally therethrough, a lower face on said body providing a plurality of cut grooves therein, a cutter member for selective engagement in one of the grooves of said body, a plunger for reciprocal movement in said body with the terminal ends of said plunger extending past the confines of said body, a striker head on one end of said plunger, a flat disk at the lower end of said plunger for movement within said cutter members, a shoulder on said plunger in position away from said striker head, and adjustable limit means positioned for engagement with said striker head and shoulder to regulate the length of extension for said plunger and flat disk past said body for adjusting the depth of cut made by said cutter members, said striker head being useful for rotating said plunger, disk and any carpet repair piece engaged therewith for properly aligning said carpet repair piece.

2. A carpet repair tool adapted for the removal of damaged carpet segments and for the replacement of carpet repair pieces comprising a body member providing a central opening longitudinally therethrough, a lower face on said body providing a plurality of cut grooves therein, a cutter member for selective engagement in one of the grooves of said body, a plunger for reciprocal movement in said body with the terminal ends of said plunger extending past the confines of said body, a striker head on one end of said plunger, a flat disk at the lower end of said plunger for movement within said cutter members, a shoulder on said plunger in position away from said striker head, adjustable limit means positioned for engagement with said striker head and shoulder to regulate the length of extension for said plunger and flat disk past said body for adjusting the depth of cut made by said cutter member, said striker head being useful for rotating said plunger, disk and any carpet repair piece engaged therewith for properly aligning said carpet repair piece, and spring means intermediate said body and the shoulder on said plunger for biasing said plunger toward a selected position.

References Cited in the file of this patent

UNITED STATES PATENTS

| | | |
|---|---|---|
| 213,013 | Turner | Mar. 4, 1879 |
| 915,611 | Lane | Mar. 16, 1909 |
| 2,008,725 | Parker | July 23, 1935 |
| 2,086,435 | Rapp | July 6, 1937 |
| 2,537,455 | Genovese | Jan. 9, 1951 |